UNITED STATES PATENT OFFICE.

MAURICIO M. MONSANTO, OF HOBOKEN, NEW JERSEY, ASSIGNOR OF ONE-HALF TO CHARLES F. BURGER, OF NEW YORK, N. Y.

PROCESS OF PURIFYING BRINES.

SPECIFICATION forming part of Letters Patent No. 436,633, dated September 16, 1890.

Application filed February 27, 1890. Serial No. 341,987. (No specimens.)

*To all whom it may concern:*

Be it known that I, MAURICIO M. MONSANTO, of Hoboken, county of Hudson, and State of New Jersey, have invented certain new and useful Improvements in the Process of Purifying Brines, of which the following is a full, clear, and exact description.

The object of this invention is a new and useful process for the purification of brines for the production of merchantable salt.

The invention consists in the application to the brine of the salt trisodium phosphate ($Na_3PO_4$) for eliminating the lime, magnesia, iron, &c., and their compounds, out of the brine by forming insoluble phosphates with the phosphoric acid of the trisodium phosphate, so that these impurities can be extracted by subsidence or filtration from the brine.

The impurities ordinarily found in brines are the sulphates, carbonates, and chlorides of lime, magnesia, and iron, which substances form scale on the heating-surfaces of the evaporating-pans and also produce impure salt.

The base of $Na_3PO_4$ being sodium it will have no effect whatever on the chloride of sodium, but, through the decomposition by the phosphoric acid of the compounds of lime, magnesia, &c., the liberated sulphuric acid of the sulphates will form sulphate of soda from the soda of the $Na_3PO_4$, which sulphate of soda is highly soluble and will remain in the mother-liquid, and is not injurious to health nor detrimental to the quality of the salt made. The chlorine liberated from the impurities will also combine with the sodium of the $Na_3PO_4$, thereby forming common salt—chloride of sodium—increasing, consequently, the output. The sodium phosphate, though of alkaline reaction, is not caustic, but perfectly neutral, and has the property of preserving iron and of saturating any free acids that may be introduced in the brine or that may be produced in the process of manufacture, which is not the case with ordinary sodium phosphate.

The calcium and magnesium which are converted in this process into insoluble phosphates are very light and flocculent and have the property of enveloping other impurities, an action similar to that of gelatinous substances or of coagulated albumen, and clarify in the same way.

The trisodium phosphate has, as found in practice, the further unexplained property of destroying the adhesive quality of sulphate of lime to the heating-surfaces of the brine-evaporating vessels, and of preventing the formation of scale thereon, even when a less quantity of the $Na_3PO_4$ is used than is required to fully saturate the sulphate of lime. Therefore much less of the trisodium phosphate than any other purifying compound is required in making good commercial salt, and its use is very economical. The trisodium phosphate may be applied to the brine when the latter is in the cold state in tanks or when it is hot.

The precipitate may be allowed to subside to the bottom of the containing-vessel and the clarified and purified brine be drawn off from above it, or the whole contents of the vessel may be passed through a filter, preferably through a filter-press, or the trisodium phosphate may be introduced directly into the evaporating-vessel, where it will convert the impurities in the brine into harmless precipitates, which will remain in a flocculent condition in the mother-liquid. This trisodium phosphate may also be applied in combination with any inert granulated substance—such as charcoal, coke, sawdust, and the like—which substance would materially aid in the separation from the brine by subsidence or filtration of the impurities therein, especially if the filtration be done through a filter-press, as the combination of the granular substance with the flocculent precipitate would produce a porous mass that would prevent the serious clogging of the filter, and could readily be cleaned off.

I am aware of the United States Patent No. 370,583, of September 27, 1887, and hereby disclaim the use or application of trisodium or trisodic phosphate as an anti-incrustator in steam-boilers.

Having thus described my invention, I claim as new and desire to secure by Letters Patent—

In the manufacture of salt, the process, substantially as herein described, of purifying brines by introducing therein trisodium phosphate in sufficient quantity to decompose and precipitate the impurities in the brine, and in then separating the purified brine from the precipitate by decantation or filtration, as set forth.

In testimony that I claim the foregoing I have hereunto set my hand, in the presence of two witnesses, this 26th day of February, 1890.

MAURICIO M. MONSANTO.

Witnesses:
JACOB J. STORER,
ROBT. P. GETTY, Jr.